United States Patent
Wang et al.

(10) Patent No.: US 10,661,985 B2
(45) Date of Patent: May 26, 2020

(54) SINGLE-BUTTON CONTROL METHOD OF AN INDUCTION ACTUATED CONTAINER

(71) Applicant: FUJIAN NASHIDA ELECTRONIC INCORPORATED COMPANY, Fujian (CN)

(72) Inventors: Xin Wang, Fuzhou (CN); Jiangqun Chen, Fuzhou (CN); Zhou Lin, Fuzhou (CN)

(73) Assignees: NINE STARS GROUP (U.S.A.) INC., Pomona, CA (US); FUJIAN NASHIDA ELECTRONIC INCORPORATED COMPANY, Fuzhou, Fujian (CN)

( * ) Notice: Subject to any disclaimer, the term of this patent is extended or adjusted under 35 U.S.C. 154(b) by 0 days.

(21) Appl. No.: 16/318,364

(22) PCT Filed: Jul. 17, 2017

(86) PCT No.: PCT/CN2017/093120
§ 371 (c)(1),
(2) Date: Jan. 16, 2019

(87) PCT Pub. No.: WO2018/184318
PCT Pub. Date: Oct. 11, 2018

(65) Prior Publication Data
US 2019/0283964 A1 Sep. 19, 2019

(30) Foreign Application Priority Data
Apr. 7, 2017 (CN) .......................... 2017 1 0224034

(51) Int. Cl.
*B65F 1/16* (2006.01)
*H02P 7/03* (2016.01)
*H02P 7/20* (2006.01)

(52) U.S. Cl.
CPC .............. *B65F 1/1638* (2013.01); *H02P 7/04* (2016.02); *H02P 7/20* (2013.01); *B65F 2210/168* (2013.01)

(58) Field of Classification Search
CPC ..................................... H02P 7/20; H02P 7/04
USPC ...................................................... 318/16, 34
See application file for complete search history.

(56) References Cited

U.S. PATENT DOCUMENTS 8,396,592 B2 * 3/2013 Jones ...................... A47L 11/00
318/568.12

* cited by examiner

*Primary Examiner* — David Luo
(74) *Attorney, Agent, or Firm* — Raymond Y. Chan; David and Raymond Patent Firm

(57) ABSTRACT

A single-button control method of an induction actuated container, wherein the method comprises the steps of activating the control system of the container to enable the IR sensor operate in a normally-detecting state; detecting an object within a detecting area of the IR sensor; actuating, in responsive to a click of the control button, the cover panel to move to its opened position, when the control system is in the power-on state and the cover panel is in the closed position; normally retaining, in responsive to a click of the control button, the cover panel in the opened position, when the cover panel is moved to its opened position in responsive to an object detection; and actuating, in responsive to a click of the control button, the cover panel to move to its closed position, when the cover panel is in the normally-opened position.

8 Claims, 3 Drawing Sheets

SINGLE-BUTTON CONTROL METHOD OF AN INDUCTION ACTUATED CONTAINER

CROSS REFERENCE OF RELATED APPLICATION

This is a non-provisional application that claims the benefit of priority under 35 U.S.C. § 371 to international application number PCT/CN2017/093120, international filing date Jul. 17, 2017, wherein the entire contents of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a control method of an induction actuated container with a single button.

Description of Related Arts

Some of conventional induction actuated containers, such as trash containers, don't have a normally-opened function, which is very inconvenient in case of that trashes are thrown into the container frequently. However, such cases occur quite often in daily life. For example, when washing dishes during cooking, eating sunflower seeds, or peeling the skin of fruits, the cover panel of the trash container should be maintained in opened position (in the normally-opened state) for receiving the trashes generated in these activities.

Still, there are some induction actuated containers with normally-opened function in the market. However, for fulfilling this function, all of them are equipped with two buttons which are symmetrically provided on both sides of a control panel of the container, wherein one button at one side of the control panel is configured for manually opening the cover panel and the other button on the opposite side is configured for manually closing the cover panel. Sadly, users may easily press a wrong button in controlling the states of the container during use.

In addition, the conventional induction actuated containers in the market include a mechanical power switch, most of which are installed on a back side of the container. However, it is inconvenient to operate the power switch at such a position. Moreover, the mechanical power switch is turned on by an attachment of metal contacts which are easily oxidized when the trashes container is disposed in a harsh environment for a long period of time. Accordingly, the oxidized metal contacts would result in a poor contact of the mechanical power switch.

SUMMARY OF THE PRESENT INVENTION

The invention is advantageous in that it provides a single-button control method of an induction actuated container, wherein the operations to manually open and close the cover panel of the trash container are controlled by a same control button, so as to reduce button operating errors.

Another object of the present invention is to provide a single-button control method of an induction actuated container, wherein when the trash container is in a normally-opened state, the power supply for the IR sensor is shut down under control of a microcontroller unit and then the microcontroller unit enters a suspended mode for reducing the power-consumption of the trash container.

Another object of the present invention is to provide a single-button control method of an induction actuated container, wherein the operations to power on and power off of the container are also controlled by the control button based on a length of the time the control button is depressed, so as to improve the reliability and convenience of the manipulation for the trash container.

Another object of the present invention is to provide a single-button control method of an induction actuated container, wherein the operations to power on and power off of the container are also controlled by the control button, such that the number of the electronic components for the trash container can be minimized and the circuit can be simplified as well, so as to enhance the reliability of the trash container and to reduce the manufacturing cost thereof.

Another object of the present invention is to provide a single-button control method of an induction actuated container, wherein the conventional mechanical power switch is upgraded to an electronic switch, such that the problem of poor contact of the mechanical power switch caused by oxidation of the metal contacts can be overcome accordingly.

Additional advantages and features of the invention will become apparent from the description which follows, and may be realized by means of the instrumentalities and combinations particular point out in the appended claims.

According to the present invention, the foregoing and other objects and advantages are attained by a single-button control method of an induction actuated container, wherein the induction actuated container comprises a control system which comprises a control button, an IR sensor, a microcontroller unit, a drive circuit and a motor to move a cover panel of the container between an opened position and a closed position, wherein the control method comprises the following steps.

Activate the control system of the induction actuated container, such that the control system is in a power-on state, wherein when the control system is in the powered-on state, the IR sensor controlled by the micro controller unit is operating in a normally detecting state.

Detect an object within a predetermined detecting area of the IR sensor, wherein if a presence of an object within the predetermined detecting area is detected, the cover panel of the container is moved to its opened position by the motor, wherein the motor is controlled by the microcontroller unit through the drive circuit, and if not, the IR sensor remains operating in the normally-detecting state.

Actuate, in responsive to a click of the control button, the cover panel to move to its opened position by the motor, when the control system is in the power-on state and the cover panel is in the closed position, wherein the motor is controlled by the microcontroller unit through the drive circuit, Normally retain, in responsive to a click of the control button, the cover panel in the opened position such that the cover panel is in a normally-opened position, when the control system is in the power-on state and the cover panel is moved to its opened position in responsive to a presence of an object within the detecting area of the IR sensor Actuate, in responsive to a click of the control button, the cover panel to move to its closed position, when the cover panel is in the normally-opened position.

In one embodiment of the present invention, the cover panel is moved to its closed position when no click of the control button is detected within a predetermined time period T after the cover panel is moved to its opened position in responsive to a presence of an object within the detecting area of the IR sensor.

In one embodiment of the present invention, the microcontroller electrically connected with the control button has a wake-up function at an input port thereof, such that the power supply for the IR sensor is shut down by the microcontroller unit to exit the IR sensor from its normally-detecting state and the microcontroller unit enters a suspended mode simultaneously, when the cover panel of the container is in the normally-opened position. The microcontroller unit will not woken up from its suspended mode until the control button is depressed and then the cover panel is moved to its closed position and the IR sensor returns to its normally-detecting state under control of the microcontroller unit.

In one embodiment of the present invention, the control system of the induction actuated container is turned off into a power-off state in responsive to the control button being pressed and held for a predetermined time t, when the control system is in the power-on state and the cover panel is in the closed position. And when the cover panel is in the opened position, the cover panel is firstly moved to its closed position and then the control system is turned off into the power-off state thereof in responsive to the control button being pressed and held for a predetermined time t. In addition, the control system of the container is restarted in responsive to a click of the control button, when the control system is in a power-off state.

In one embodiment of the present invention, the microcontroller electrically connected with the control button has a wake-up function and a timing function at an input port thereof, wherein the control system of the container enters a power-off state in responsive to the electrical level at the input port of the microcontroller unit waving for more than a predetermined time period t, caused by the control button being pressed and held for a predetermined time period t, when the control system is in its power-on state. When the control system is in the power-off state, the power supply for the IR sensor is shut down under control of the microcontroller unit to exist its normally-detecting state, and the microcontroller unit enters a suspended mode simultaneously. The control system of the induction actuated container is rebooted into the power-on state in responsive to a click of the control button, and the microcontroller unit is woken up from the suspended mode.

In one embodiment of the present invention, the t is ranged from 2 to 4 seconds.

In one embodiment of the present invention, the control button is an electrical touch switch.

In one embodiment of the present invention, the detecting area of the IR sensor is located above a detecting window of the container at a front peripheral edge thereof.

Compared with the conventional induction actuated container in the prior art, the present invention is advantageous that the operations to manually open and close the cover panel of the trash container are under control of one single button, which brings a great convenience for the user since they don't have distinguish a right button (either the button on the left side or the button on the right side). As such, button operating errors can be minimized. Further, the operations to power on and off the control system of the container are also under control of the same control button, such that the conventional mechanical power switch can be abandoned. In other words, four operation functions (manually opening the cover panel, manually closing the cover panel, turning on the control system and turning off the control system) are integrated on the single one control button. Such one-button control mode is easily for the user to understand and manipulate. Further, the number of the electronic components for the trash container can be minimized and the circuit can be simplified as well, such that the reliability of the trash container can be enhanced and the manufacturing cost thereof can be reduced. Further, the conventional mechanical power switch for the container is upgraded to an electronic switch, such that the problem of poor contact of the mechanical power switch caused by oxidation of the metal contacts can be overcome accordingly. In addition, considering the power consumption when the container is in the normally-opened position and the power-off position, the power supply for the IR sensor is shut down and the microcontroller unit is disposed in a suspended mode, when the container are in the above two positions.

Still further objects and advantages will become apparent from a consideration of the ensuing description and drawings.

These and other objectives, features, and advantages of the present invention will become apparent from the following detailed description, the accompanying drawings, and the appended claims.

Figure 1:
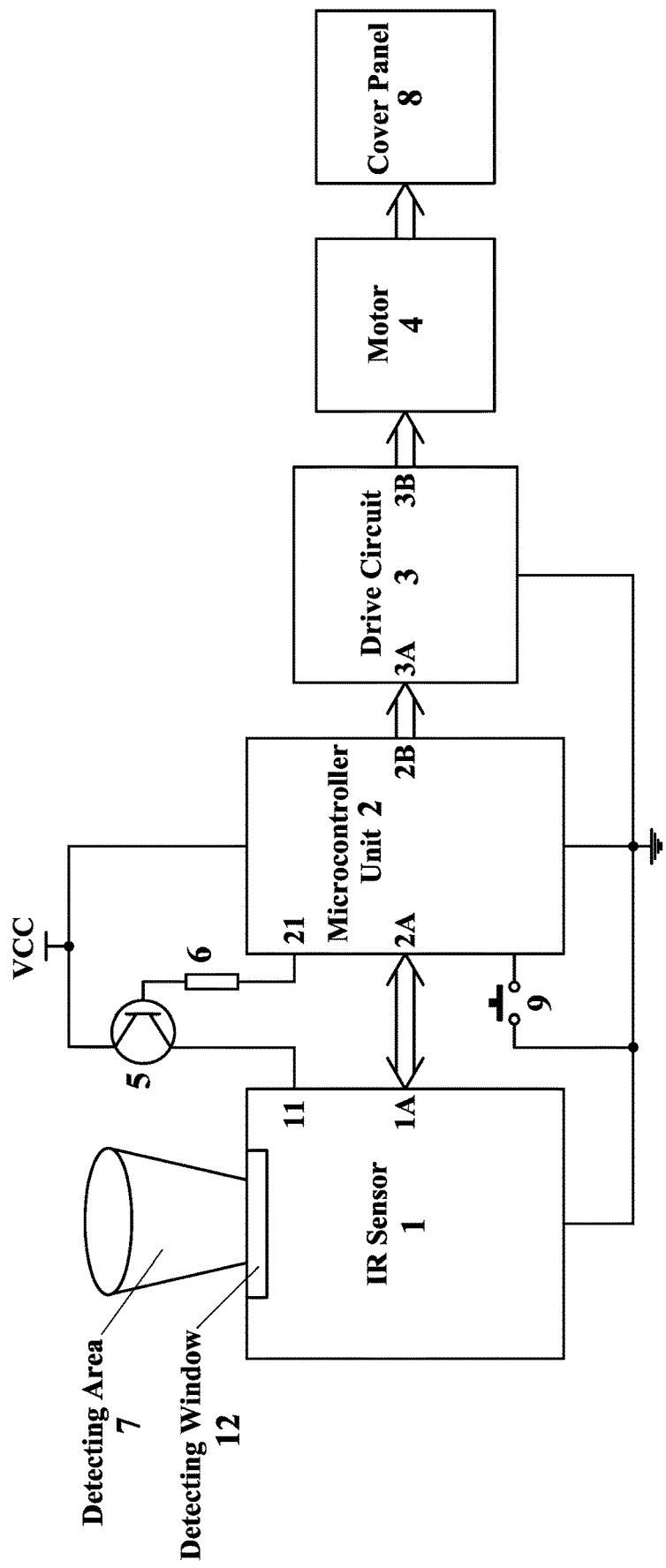
FIG. 1 is a circuit block diagram of the single-button control method of an induction actuated container according to a preferred embodiment of the present invention.

In the drawings, 1—IR sensor, 11—power terminal of the IR sensor, 12—detecting window, 1A—signal communication terminal assembly of the IR sensor which are connected with the microcontroller unit, 2—microcontroller unit, 21—an output port of the microcontroller for controlling the power supply to the IR sensor, 2A—signal communication terminal assembly of the microcontroller unit which is connected with the IR sensor, 22—an input port of the microcontroller electrically connecting with an control button, 2B—an output port assembly of the microcontroller to control a drive circuit, 3—drive circuit, 3A—terminal assembly of the microcontroller unit for controlling the drive circuit, 3B—output port assembly of the drive circuit, 4—motor, 5—PNP triode, 6—current-limting resistance, 7—detecting area, 8—cover panel, 9—control button.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The present invention provides a single-button control method of an induction actuated container, wherein the induction actuated container comprises a control system. Accordingly, the control system comprises a control button, an IR sensor, a microcontroller unit, a drive circuit, and a motor for actuating a cover panel of the container to move between an opened position and a closed position.

In particular, the control method of the present invention in implemented as follows.

First, the control system of the induction actuated container is activated that the control system enters a power-on state and the IR sensor controlled by the Micro controller unit is operating in a normally detecting state.

Here, the normally-detecting state of the IR sensor indicates a state that the IR sensor is detecting an object within its detecting area. If an object is detected, the cover panel of the container is moved to its opened position by the motor which is under control of the microcontroller unit through the drive circuit. If no object is detected, the IR sensor stays in the normally-detecting state.

When the control system is in the power-on state and the cover panel is in the closed position, the cover panel is, in responsive to click of the control panel, moved to the opened position and then retained in the opened position by the motor by the microcontroller unit, wherein the motor is controlled by the microcontroller unit through the drive circuit.

When the control system is in the power-on state and the cover panel is moved to its opened position in responsive to a presence of an object within the detecting area of the IR sensor, the cover panel is maintained in the opened position in responsive to a click of the control button, such that the cover panel is in a normally-opened position.

When the cover panel is in the normally-opened position (being maintained in the opened position), the cover panel is moved to the closed position in responsive to a click of the control button.

Further, the cover panel is moved to its closed position when no click of the control button is detected within a predetermined time period T after the cover panel is moved to its opened position in responsive to a presence of an object within the detecting area of the IR sensor The microcontroller electrically connected with the control button has a wake-up function at an input port thereof, such that the power supply for the IR sensor is shut down by the microcontroller unit to exit the IR sensor from its normally-detecting state and the microcontroller unit enters a suspended mode simultaneously, when the cover panel of the container is in the normally-opened position. The microcontroller unit will not woken up from its suspended mode until the control button is depressed and then the cover panel is moved to its closed position and the IR sensor returns to its normally-detecting state under control of the microcontroller unit.

When the control system is in the power-on state and the cover panel is in the closed position, the control system of the induction actuated container is turned off into a power-off state in responsive to the control button being pressed and held for a predetermined time t. And when the cover panel is in the opened position, the cover panel is firstly moved to its closed position and then the control system is turned off into the power-off state thereof in responsive to the control button being pressed and held for a predetermined time t. In addition, the control system of the container is restarted in responsive to a click of the control button, when the control system is in a power-off state.

Alternatively, the microcontroller electrically connected with the control button has a wake-up function and a timing function at an input port thereof, wherein the control system of the container enters a power-off state in responsive to the electrical level at the input port of the microcontroller unit waving for more than a predetermined time period t, caused by the control button being pressed and held for a predetermined time period t, when the control system is in its power-on state. When the control system is in the power-off state, the power supply for the IR sensor is shut down under control of the microcontroller unit to exist its normally-detecting state and the microcontroller unit enters a suspended mode simultaneously. The control system of the induction actuated container is rebooted into the power-on state in responsive to a click of the control button, and the microcontroller unit is woken up from the suspended mode.

Preferably, the time period t is ranged from 2 to 4 seconds.

Preferably, the control button is an electrical touch switch.

Preferably, the detecting area of the IR sensor is located above a detecting window of the container at a front peripheral edge thereof.

Figure 2:
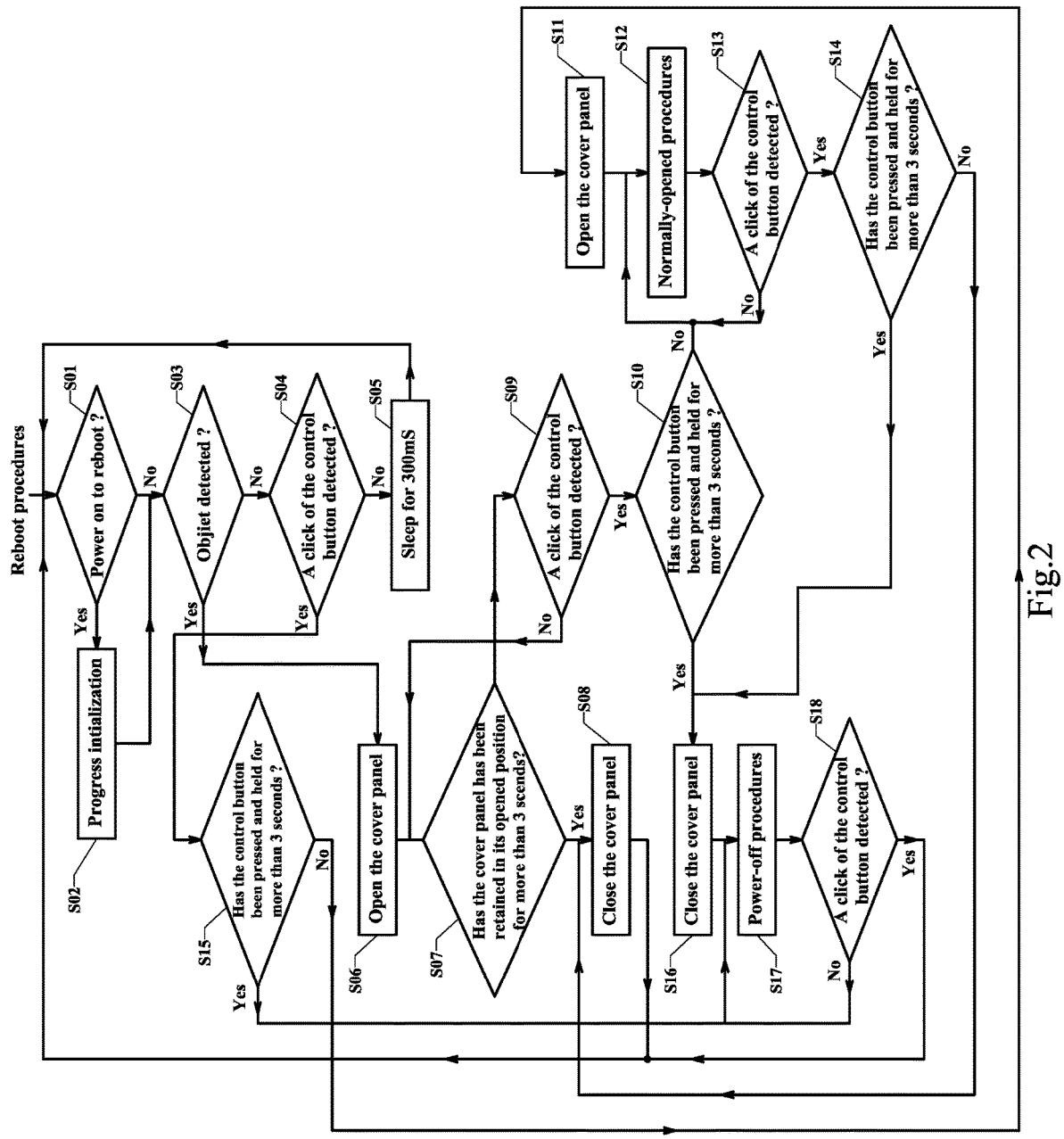
FIG. 2 is a flow diagram of the single-button control method of an induction actuated container according to the above preferred embodiment of the present invention.

Referring to FIGS. 1 and 2 of the drawings, a single-button control method of an induction actuated container according to a preferred embodiment is illustrated, wherein the control system of the container comprises a control button 9, an IR sensor 1, a microcontroller unit 2, a drive circuit 3, a motor 4, a cover panel 8, a PNP triode 5, a current-limiting resistor 6, wherein the control button 9 is electrically connected with an input port 22 of the microcontroller unit 2.

In a normal induction actuation programs, the electrical level at the input port 22 of the microcontroller unit 2 would change from a high level to a low level in responsive to a click of the control button 9, when the cover panel 8 is in a closed position. If the control button 9 is pressed and held for less than 3 seconds, the cover panel 8 is actuated to move to its opened position from the close position and then retained in the opened position (namely normally-opened position). If the cover panel 8 is moved to the opened position after responding to an object detection, the cover panel 8 would be maintained in its opened position in responsive to a click of the control button 9. If the cover panel 8 is in the normally-opened position, the cover panel 8 would move to its closed position in responsive to a click of the control button 9 and then the container operates a normally-detecting procedures.

In particular, the normal detecting procedures in the present invention indicate that in a normally-detecting state, the IR sensor 1 is detecting an object within its detecting area. If an object is detected, the microcontroller unit 2 would control the drive circuit 3 to activate the motor 4 which in turn drive the cover panel 8 to its opened position. After the cover panel 8 is retained in its opened position for about 3-5 seconds, the microcontroller unit 2 would control the motor 8 through the drive circuit 5 to move the cover panel 8 back to its closed position and then the container returns normally-detecting state.

In case of that the control system is in the power-on state, the electrical level at the input port 22 of the microcontroller unit would changed to a low level from the high level and the low level state would last more than 3 seconds in responsive to the control button 9 being pressed and held for more than 3 seconds, when the cover panel 8 is in the closed position, and then the control system is turned off into its power-off state. Accordingly, when the cover panel 8 is in the opened position, the cover panel 8 would firstly be moved to its closed position and then the control system enters the power-off state in responsive to the control button 9 being pressed and held for more than 3 seconds. Further, the control system of the container is rebooted to its power-on state in responsive to a click of the control button 9, when the control system is in its power-off state.

In other words, the functions to power on and off the control system are also integrated on the same control button 9, such that conventional mechanical power switches may not be required in the present invention. Accordingly, the control button 9 in the present invention has four functions: manually normally-opening the cover panel 8, manually closing the cover panel 8, powering on the control system and powering off the control system.

In order to reduce the electrical power consumption of the container in its normally-opening state, the microcontroller unit 2 has a wake-up function at the input port 22 thereof. Accordingly, when the cover panel 8 is maintained in its opened position, the electrical level at the input port 22 of the microcontroller unit is shifted to a high level to shut off the power terminal 11 of the IR sensor 1 by a current-limiting resistor 6 and a PNP triode 5. Meanwhile, the microcontroller unit 2 itself enters a suspended mode thereof.

Further, when the cover panel 8 is in the normally-opened position and the microcontroller unit 2 is in the suspended mode, the microcontroller unit 2 is woken up from its suspended mode in responsive to an electrical level change at the input port 22 thereof caused by a click of the control button 9. And then, the cover panel 8 is moved to its closed position, and the control system operates the normal induction actuation programs.

In another embodiment of the present invention, in order to reduce the power consumption of the container in its power-off state, the microcontroller unit 2 has a wake-up and timing function at an input port 22 thereof. When the control system of the container is in the power-on state and operates normal induction actuation programs, the control system would transfer to its power-off state in responsive to a detection that the electrical level at the input port 22 of the microcontroller unit 2 being waved for more than 3 seconds caused by the control button 9 being pressed and held for more than 3 seconds. Accordingly, if the cover panel 8 is in the opened position prior to the control system being powered off, the cover panel 8 would firstly be moved to its closed position and then the control system enters the power-off state. If the cover panel 8 is in its closed position before the control system is powered off, the control system would immediately enters its power-off state.

When the control system is in the power-off state, the electrical level at the input port 22 of the microcontroller unit 2 is changed to a high level and the power terminal 11 to the IR sensor 1 is shut off by the current-limiting resistor 6 and PNP triode 5. Then, the microcontroller unit 2 is transferred to its suspended mode. Accordingly, the microcontroller unit 2 is woken up from its suspended mode and the control system of the container would enters its power-on state in responsive to a click of the control button 9, when the control system is in its power-off state.

In this preferred embodiment of the present invention, when the control system operates the normal induction actuation programs, the electrical level at the input port of the microcontroller unit 2 would wave for more than 3 seconds, if the control button 9 is pressed and held for more than 3 seconds. In responsive to the electrical level variation, the control system is switched to its power-off state from the power-on state. It is appreciated that the threshold 3 seconds is ergonomically designed.

Preferably, the control button 9 adopted in the single-button control method of an induction actuated container may be an electrical touch switch. Detailed description for the electrical touch switch is omitted, since it is a well-known technology.

FIG. 2 is a flow diagram of the illuminating device the single-button control method of an induction actuated container according to the above preferred embodiment of the present invention. As shown in the FIG. 2, the control method comprises the following steps.

In step S01, the control system is reset. The step S01 is executed after the control system is turned on or after the step S05, S08 or S18. In particular, if the step S01 is executed after the control system is turned on, then the control method would flow to step 02 to initialize the programs of the control system. If the step S01 is executed after the step S05, S08 or S18, then the control method would flow to step 03.

In step S02, the programs of the control system is initialized that the port 21 is set as an output port with a high electrical level, the port 22 is set as an input port and the terminal assembly 2B is set as an output port, the drive circuit 3 does not work and the motor 4 does not work either.

In step S03, the electrical level at the port 21 is switched to a low level, such that the IR sensor 1 is electrically conducted to a power source Vcc. Then the microcontroller unit 2 controls the IR sensor 1 to transmit IR detecting signal to detect an object in its detecting area through the terminal assembly 2A. If no object is detected, the method would flow to the step 04; if an object is detected, the method would flow to step 06.

In step S04, a determination on whether a click of the control button 9 is detected is made. According to the determination result, if it is true, then the method would enter step S15; if not, the method would enter step S05.

In step S05, the microcontroller unit 2 is suspended to sleep for 300 ms and then the method flows to the step S01.

In step S06, the microcontroller unit 2 controls the motor to rotate clockwise by the output terminal assembly 2B to move the cover panel 8 to its opened position. Then the method flows to step S07.

In step S07, a determination on whether the cover panel 8 is retained in its opened position for more than 3 seconds is made. According to the determination result, if it is true, then the method would flow to step S08; if not, then the method would flow to step S09.

In step S08, the microcontroller unit 2 controls the motor 4 to rotate anti-clockwise to move the cover panel 8 to its closed position, wherein the motor 4 is activated by the drive circuit 3 which is controlled by the microcontroller unit 2 through the output terminal assembly 2B. Then, the method would flow to step S10.

In step S09, a determination on whether a click of the control button 9 is detected is made. According to the determination result, if it is true, then the method would flow to step S07; if not, the method would flow to step S10.

In step S10, a determination on whether the control button 9 is pressed and held for more than 3 seconds is made. According to the determination outcome, if it is true, the method would flow to step S16; if not, the method would flow to step S12.

In step S11, the microcontroller unit 2 controls the motor 4 to rotate clockwise via the output terminal assembly 2B to move the cover panel 8 to its opened position. Then, the method flows to step S12.

In step S12, the cover panel 8 is maintained in its opened position, while the power terminal 11 to the IR sensor 1 is shut off and the microcontroller unit 2 enters its suspended mode.

In step S13, the method remains in the step 12 if no click of the control button 9 is detected. If else, the method would flow to step S14.

In Step S14, a determination on whether the control button 9 is pressed and held for more than 3 seconds is made. According to the determination result, if it is true, then the method would flow to step S08; if not, the method would flow to step S16.

In step S15, a determination on whether the control button 9 is pressed and held for more than 3 seconds is made. According to the determination result, if it is true, then the method would flow to step S17; if not, the method would flow to step S11.

In step S17, the control system is powered off and the cover panel 8 is retained in its closed position. At the same time, the power terminal 11 to the IR sensor 1 is shut off, and the microcontroller unit 2 enters its suspended mode for reducing power-consumption.

In step S18, if no click of the control button 9 is detected, then the method remains in the step S17. If else, the method would flow to the step S01.

Figure 3:
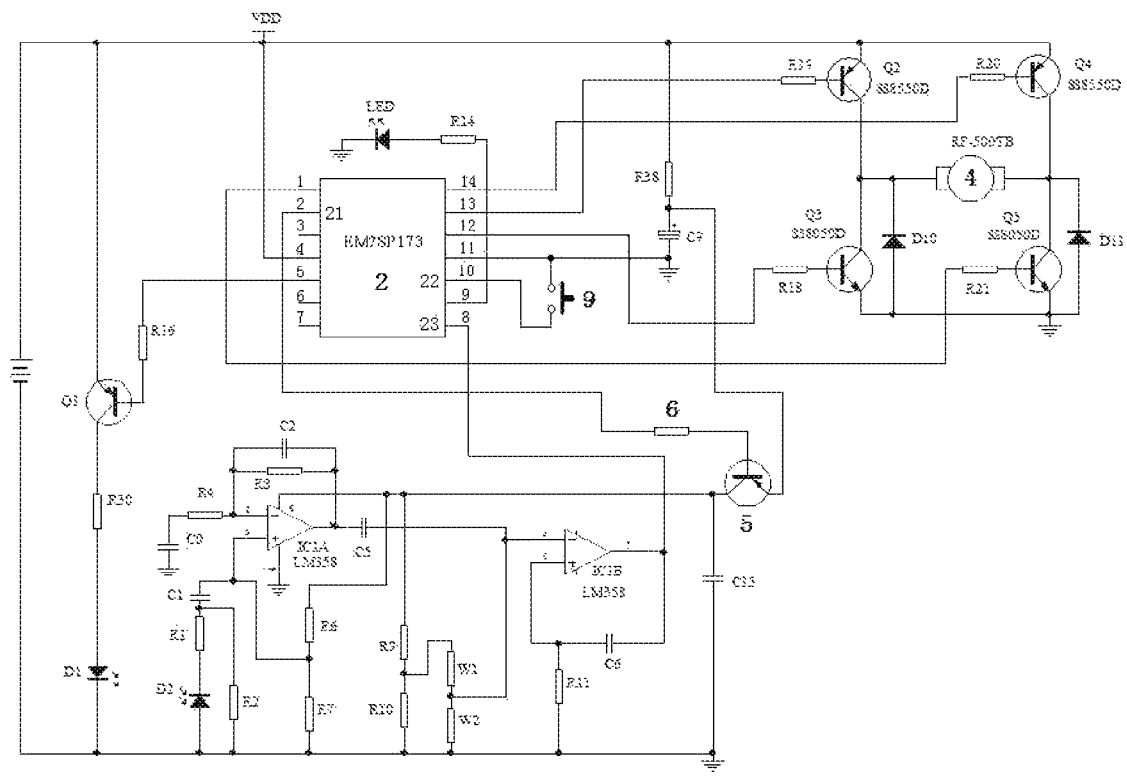
FIG. 3 is a circuit diagram of the single-button control method of an induction actuated container according to the above preferred embodiment of the present invention.

FIG. 3 is a circuit diagram of the single-button control method of an induction actuated container according to the above preferred embodiment of the present invention. As shown in the FIG. 3 of the drawings, one electrical end of the control button is electrically connected to the microcontroller unit 2 at the port 22 thereof, more specifically on tenth pin of the port 22, while the other end is electrically connected to the ground. The active IR sensor 1 comprises a dual operational amplifier IC1 (model-LM358), an infrared emission tube D1, an infrared receiving tube D2, a triode Q1, a plurality of capacitors (C0, C1, C2, C5, C6, C13), and a plurality of resistors (R1, R2, R3, R4, R6, R7, R9, R10, W1, W2, R11, R16, R30). The model of the microcontroller unit 2 adopted in the preferred embodiment is EM78P173. The drive circuit 3 comprises two PNP triodes Q2 and Q4 (model-SS8550D), two NPN triodes Q3 and Q5 (model-SS8050D), and two diodes D10 and D11, and four resistors R18, R19, R20 and R21. The model of the motor 4 in the preferred embodiment is RF-500 TB. In addition, the resistor R38 and the capacitor C9 are configured for filtering the electrical power supplied to the IR sensor 1.

Referring to FIG. 2 and FIG. 3 of the drawings, the main operating principle of the control system is described as follows.

Immediately the microcontroller unit 2 is powered on, the step S01 is executed, and then the method enters the step S02 to initialize the programs of the control system of the container. In the initiation process, the port 21 of the microcontroller unit 2 (the second pin of the microcontroller unit 2) is set as an output port with a high electrical level to cut off the PNP triode 5, such that the power supply to the IR sensor 1 is shut down by the cut-off PNP triode 5. Further, the fifth pin of the microcontroller unit 2 is set as an output port thereof with a high electrical level to cut off the triode Q1, such that the infrared emission tube D1 is unable to transmit infrared signal. Further, the port 22 (the tenth pin of the microcontroller unit 2) is set as an input port in a pull-up mode and has a wake-up function, while the eighth pin of the microcontroller unit 2 is set as an input port. Further, the terminal assembly 2B of the microcontroller unit (the first pin, the twelfth pin, the thirteenth pin, and the fourteenth pin of the microcontroller unit 2) is set as output ports, wherein the first and twelfth pins are in low electrical level and the thirteenth and fourteenth pins are in high electrical level, such that the triodes Q2-Q5 are cut off to deactivate the drive circuit 3 and the motor 4 would not operate.

Then, the method enters the step S03, wherein the second pin of the microcontroller unit 2 is switched to a low electrical level to conduct the PNP triode 5, such that the electrical power filtered by the resistor R38 and the capacitor C9 can be conducted to the IR sensor 1. After the circuit of the IR sensor 1 is stabilized for delaying about 8 ms, a negative pulse signal is transmitted from the fifth pin of the microcontroller unit 2 to activate the infrared emission tube D1 of the IR sensor 1, wherein the activated infrared emission tube D1 transmits an infrared detecting pulse signal within its detecting area. If no reflected infrared pulse signal is detected at the eighth pin of the microcontroller unit 2, the method would flow to the step S04. If else, the method would flow to the step S06.

In the step S04, if no click of the control button 9 is detected, the tenth pin of the microcontroller unit 2 would remain in a high electrical level because of an inner pull-up resistor and the method would flow to the step S05.

In the step S05, the electrical level at the port 21 of the microcontroller unit 2 is switched to a high level to cut off the power supply to the IR sensor 1, and then the microcontroller unit 2 enters its suspended mode. After staying in the suspended mode for 300 mS, the microcontroller unit 2 would be woken up to perform the step S01.

Accordingly, if a click of the control button 9 is detected in the step S04, the method would flow to the step S15. In the step S15, a determination on whether the control button 9 is pressed and held for more than 3 seconds is made. If the determination result is false, the method would flow to step S11. In the step S11, the terminal assembly 2B of the microcontroller unit 2 is set in high electrical level at the first and fourteenth pins thereof, while the twelfth and thirteenth pins are set in low electrical level, such that the triodes Q2 and Q5 are turned on and the triodes Q3 and Q4 are cut off, so as to control the motor 4 to rotate clockwise for about 1 second to move the cover panel 8 to its opened position. Then, the method flows to the step S12 to maintain the cover panel 8 in its opened position.

If the determination result is true, the method would flow to the step S17 where the control system is powered off and the cover panel 8 is moved to and retained in its closed position. In particular, in the step S17, the port 21 of the microcontroller unit 2 (the second pin of the microcontroller unit 2) is switched to a high electric level to cut off the PNP triode 5, such that the power supply for the IR sensor 1 is shut off by the cut-off PNP triode 5. Meanwhile, the terminal assembly 2B of the microcontroller unit 2 is switched to a low electrical level at the first and twelfth pins thereof, and the thirteenth, and fourteenth pins are set in high electrical levels, such that the triodes Q2-Q5 are cut off, the drive circuit 3 is deactivated, the motor 4 would not operate and the microcontroller unit 2 enters its suspended mode for reducing power consumption.

As mentioned above, if a reflected infrared pulse signal is detected in the step S03, the method would flow to the step S06. In the step S06, the terminal assembly 2B of the microcontroller unit 2 is switched to a high electrical level at the first and fourteen pins thereof, while the twelfth and thirteenth pins are set in low electrical levels, such that the triodes Q2 and Q5 are turned on and the triodes Q3 and Q4 are cut off to actuate the motor 4 to rotate clockwise, which in turn move the cover panel 8 to its opened position.

Then, the method flows to the step S07. In the step S07, the terminal assembly 2B of the microcontroller unit 2 is switched to a high electrical level at the first, twelfth, thirteenth and fourteen pins thereof, such that the triodes Q3 and Q5 are turned on the triodes Q2 and Q4 are cut off. As such, the motor 4 is not powered on but in a braking state (since the triodes Q3 and Q5 are turned on, the two diodes D10 and D11 forms a reverse electrical current path for the motor 4 to prevent the cover panel 8 falling down easily by gravity). In particular, the cover panel 8 would be retained in its opened position for three seconds in the braking state.

In the step S07, the control system is detecting a click of the control button 9 (S09). If no click of the control button 9 is detected, the tenth pin of the microcontroller unit 2 remains in the high electric level and when the braking state ends, the method would flow to the step S08 to move the cover panel 8 to its closed position. In particular, in the step S08, the terminal assembly 2B of the microcontroller is switched to high electrical level at the twelfth and thirteenth pins thereof, while the first and fourteen pins are set in low electrical levels, such that the triodes Q2 and Q5 are cut off on and the triodes Q3 and Q4 are turn on to activate the motor 4 to rotate anti-clockwise for one second, which in turn move the cover panel 8 to its closed position. If a click of the control button 9 is detected in the step S07, the method would flow to the step S10.

In the step S10, a determination on whether the control button 9 is pressed and held for more than 3 seconds is made. Accordingly, if the determination result is false, the method would flow to the step S12 to move the cover panel 8 to its normally-opened position. In the step 12, the second pin of the microcontroller unit 2 is set in high electrical level to cut off the power supply of the IR sensor 1 via the cut-off PNP triode 5, while the terminal assembly 2B of the microcontroller unit 2 is switched to low electrical level at the first and twelfth pins thereof, and the thirteenth and fourteenth pins are set in high electrical levels, such that the triodes Q2-Q5 are cut off, the drive circuit 3 is deactivated, the motor 4 would not operate and the microcontroller unit 2 enters its suspended mode for reducing power consumption.

If the determination result is true, the method would flow to the step S16. In the step 16, the terminal assembly 2B of the microcontroller unit 2 is switched to low electrical level at the first and fourteenth pins thereof, while the twelfth and thirteenth pins are set in high electrical levels, such that the triodes Q2 and Q5 are cut off and the triodes Q3 and Q4 are turned on, so as to control the motor 4 to rotate anti-clockwise for one second to move the cover panel 8 to its closed position.

Then, the method flows to step S17 to power off the control system. In the power-off procedures, the cover panel 8 is maintained in its closed position, and the second pin of the microcontroller unit 2 is set in a high electrical level to cut off the power supply of the IR sensor 1 via the cut-off PNP triode 5. Further, the terminal assembly 2B of the microcontroller unit is switched to low electrical level at the first and twelfth pins thereof, while the thirteenth and fourteenth pins are set in high electrical level, such that the triodes Q2-Q5 are cut off, the drive circuit 3 is deactivated, the motor 4 would not operate and the microcontroller unit 2 enters into its suspended mode for reducing power consumption.

In the step S12, if no click of the control button 9 is detected, the cover panel 8 would remains in its opened position. Otherwise, the method would flow to the step S14. In the step S14, a determination on whether the control button 9 is pressed and held for more than 3 seconds is made. If the determination result is false, the method would flow to the step S08 to move the cover panel 8 to its closed position, and then the method flow back to the step S01. If the determination result is true, the method would flow to the step S16 to move the cover panel 8 to its closed position and then flow to the step S17 to power off the control system.

In the step S17, if no click of the control button 9 is detected, the cover panel 8 would remains in its closed position and the induction actuation function of the container is deactivated. If else, the method would flow to the step S01 and the induction actuation function is activated.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A single-button control method of an induction actuated container, wherein the container comprises a control system which comprises a control button, an IR sensor, a microcontroller unit, a drive circuit and a motor to move a cover panel of the container between an opened position and a closed position, wherein the control method comprises the steps of:

activating the control system of the induction actuated container, such that the control system is in a power-on state, wherein when the control system is in the powered-on state, the IR sensor controlled by the micro controller unit is operating in a normally-detecting state;

detecting an object within a predetermined detecting area of the IR sensor when the IR sensor operates in the normally-detecting state, wherein if a presence of an object within the predetermined detecting area is detected, the cover panel of the container is moved to its opened position by the motor, and if not, the IR sensor remains operating in the normally-detecting state, wherein the motor is controlled by the microcontroller unit through the drive circuit;

actuating, in responsive to a click of the control button, the cover panel to move to its opened position by the motor, when the control system is in the power-on state and the cover panel is in the closed position, wherein the motor is controlled by the microcontroller unit through the drive circuit;

normally retaining, in responsive to a click of the control button, the cover panel in the opened position such that the cover panel is in a normally-opened position, when the control system is in the power-on state and the cover panel is moved to its opened position in responsive to a presence of an object within the detecting area of the IR sensor; and actuating, in responsive to a click of the control button, the cover panel to move to its closed position, when the cover panel is in the normally-opened position.

2. The control method, as recited in claim 1, further comprises a step of:

actuating the cover panel to move to its closed position when no click of the control button is detected within a predetermined time period t after the cover panel is moved to its opened position in responsive to a presence of an object within the detecting area of the IR sensor.

3. The control method, as recited in claim 1, wherein the microcontroller electrically connected with the control button has a wake-up function at an input port thereof, wherein the method further comprises steps of:
shutting down, by the microcontroller unit, the power supply for the IR sensor to exit the IR sensor from its normally-detecting state; and
switching the microcontroller unit into a suspended mode simultaneously, wherein, when the cover panel of the container is in the normally-opened position, the method further comprises the steps of:
waking up, in responsive to a click of the control button, the microcontroller unit from its suspended mode;
actuating the cover panel to move to its closed position; and
switching the IR sensor to its normally-detecting state under control of the microcontroller unit.

4. The control method, as recited in claim 1, wherein when the control system is in the power-on state and the cover panel is in the closed position the method further comprises the steps of:
turning off, in responsive to the control button being pressed and held for a predetermined time t, the control system of the induction actuated container, such that the control system is in its power-off state, wherein when the cover panel is in the opened position, the method further comprises the steps of:
actuating the cover panel to move to its closed position; and
turning off, in responsive to the control button being pressed and held for a predetermined time t, the control system of the induction actuated container, such that the control system is in its power-off state, wherein when the control system is in a power-off state, the method further comprises a step of:
restarting, in responsive to a click of the control button, the control system of the container.

5. The control method, as recited in claim 4, wherein the microcontroller electrically connected with the control button has a wake-up function and a timing function at an input port thereof, wherein the method further comprises a step of:
switching, in responsive to the electrical level at the input port of the microcontroller unit waving for more than a predetermined time period t, the control system of the container into a power-off state, wherein the electrical level waving is caused by the control button is pressed and held for a predetermined time period t, wherein when the control system is in the power-off state, the method further comprises the steps of:
shutting down, by the microcontroller unit, the power supply for the IR sensor to exit the IR sensor from its normally-detecting state; and
switching the microcontroller unit into a suspended mode simultaneously, wherein when the control system is in the power-off state, the method further comprises the steps of:
rebooting, in responsive to a click of the control button, the control system of the induction actuated container into the power-on state; and
waking up the microcontroller unit from its suspended mode.

6. The control method, as recited in claim 5, wherein the t is ranged from 2 to 4 seconds.

7. The control method, as recited in claim 1, wherein the control button is an electrical touch switch.

8. The control method, as recited in claim 1, wherein the detecting area of the IR sensor is located above a detecting window of the container at a front peripheral edge thereof.

* * * * *